United States Patent [19]

Stover

[11] Patent Number: 4,464,981

[45] Date of Patent: Aug. 14, 1984

[54] BEVERAGE MAKING MACHINE WITH HOT WATER FAUCET

[75] Inventor: Kenneth W. Stover, Springfield, Ill.

[73] Assignee: Bunn-O-Matic Corporation, Springfield, Ill.

[21] Appl. No.: 481,578

[22] Filed: Apr. 1, 1983

[51] Int. Cl.³ .............................................. A47J 31/057
[52] U.S. Cl. ........................................ 99/280; 99/283; 99/300; 99/305
[58] Field of Search ................. 99/280, 281, 282, 283, 99/295, 300, 304, 305, 307, 309

[56] References Cited

U.S. PATENT DOCUMENTS

| | | | |
|---|---|---|---|
| 3,343,478 | 9/1967 | Hausam | 99/283 |
| 3,371,593 | 3/1968 | Price | 99/283 |
| 3,396,653 | 8/1968 | Rutherford et al. | 99/282 |
| 3,479,949 | 11/1969 | Reynolds et al. | 99/282 |
| 3,641,918 | 2/1972 | Schellgell et al. | 99/300 |
| 3,948,156 | 4/1976 | Smith | 99/280 |
| 3,978,778 | 9/1976 | Roberts | 99/305 |
| 4,413,552 | 11/1983 | Daugherty | 99/295 |

*Primary Examiner*—Robert W. Jenkins
*Assistant Examiner*—Arthur D. Dahlberg
*Attorney, Agent, or Firm*—Lockwood, Dewey, Alex & Cummings

[57] ABSTRACT

A beverage making appliance operable automatically or manually, and also providing a hot water faucet. The appliance has a cold water basin located over a hot water tank with a cold water tube extending down into the hot water tank from a basin drain opening whereby cold water discharges into the lower portion of the hot water tank and displaces hot water either through a faucet, or a spray head onto the contents of a brew funnel. When operated in its automatic mode, cold water is delivered to the basin through a conduit connected with a supply of cold water under pressure. The conduit has both flow control and solenoid valves whereby a predetermined volume of cold water is delivered on each actuation of a timer. A level control circuit, together with a water level sensing probe disposed within the hot water tank, also actuates the solenoid valve to maintain a predetermined water level in the tank as hot water is drawn through the faucet. Additional circuitry, including a relay, disables the level control circuit on actuation of the timer. The relay, through a set of normally closed contacts, electrically connects the level control circuitry with the solenoid valve. The timer is connected to the solenoid valve through a second set of normally open relay contacts. When the appliance is operated in the automatic mode, the relay disconnects the level control circuitry, allowing the timer to control the solenoid valve.

8 Claims, 4 Drawing Figures

BEVERAGE MAKING MACHINE WITH HOT WATER FAUCET

This invention relates generally to innovations and improvements in beverage brewers of the type which include hot water tanks in which a supply of hot water is maintained at brewing temperature and in operation a batch of cold water is discharged adjacent the bottom of the hot water tank so as to displace hot water from the upper portion which overflows and discharges through a spray head onto a quantity of coffee or tea supported on a filter within a brewing funnel.

More particularly, the invention relates to innovations and improvements in such a beverage brewer which is intended to operate automatically on activation of suitable electrical controls including a timer to cause a predetermined volume of cold water to be delivered to the cold water basin of the appliance for displacement of the hot water from the hot water tank.

Beverage brewers of the type having a hot water tank in which a supply of hot water is maintained for displacement by cold water and which are designed for automatic operation are well-known and have been commercially available for a number of years. They are shown and described, for example, in the following U.S. Pat. Nos. Bunn 3,100,434; Hausam 3,343,478; Martin 3,691,933; Martin 3,793,934; Martin 4,094,233 and Bunn Re. 25,663. Cold water pour-in or pour-over beverage makers have also been known and commercially available for a number of years and are shown and described, for example, in the following U.S. Pat. Nos. Martin 3,220,334; Lorang 3,354,810; Martin 3,450,024; Reynolds, 3,479,949; Martin 3,494,276; Blumfield et al 3,513,767; Martin 3,691,932; Martin 3,736,155 and Petrie 4,192,224.

Beverage brewers of the automatic type are well suited for use in restaurants, larger offices and other situations wherein there is a frequent need to produce multiple batches of coffee or tea in close succession. While coffee remains a popular beverage, there are also available a variety of instant hot beverage mixes intended to be mixed with hot water to produce single servings of such hot beverages as decaffinated coffee, tea, hot chocolate and hot soup. Accordingly, there is a need for a convenient source of plain hot water and coffee brewers are known which have faucets through which hot water may be withdrawn, usually in cup-sized quantities.

In beverage brewers of the hot water displacement type, a suitable quantity (e.g. approximately two quarts) of water is maintained at a pre-selected adjustable temperature ranging typically from 190° F. to 205° F. As hot water is needed for brewing a beverage such as coffee, a quantity of cold water equal to the quantity of hot water required is introduced by automatic or manual operation, adjacent the bottom of the hot water tank, displacing an equal quantity of hot water which discharges near the top of the tank and is used for beverage making purposes in a brewing funnel.

In view of the foregoing, it will be seen that an important object of the present invention is the provision of a beverage making appliance or beverage brewer of the hot water displacement type which incorporates a faucet or spigot which allows the removal of a relatively small quantity of hot water from the hot water holding tank.

Another important object of the invention is the provision of a beverage maker or brewer of the hot water displacement type having a faucet or spigot for removal of a relatively small quantity of hot water from the holding tank, which is compatible with the automatic system for introducing a predetermined quantity of cold water into the hot water holding tank.

A further important object of the present invention is the provision of a beverage brewer of the foregoing type which incorporates a single solenoid valve to control the flow of cold water to the hot water tank.

Still another important object of the invention is the provision of a beverage brewer of the foregoing type in which the automatic mode dominates operation of the brewer when the automatic mode is activated.

Certain other objects and advantages of the invention will become apparent from the following detailed description of a preferred embodiment of the invention taken in connection with the accompanying drawings wherein:

FIG. 3 is a top plan view taken on line 3—3 of FIG. 2 of the L-shaped integral cold water basin-hot water tank incorporated in the brewer of FIG. 1.

Except for certain important innovations and improvements incorporated into the appliance shown in FIGS. 1-4 which will be noted below, the coffee brewer shown herein corresponds to the pour-in coffee brewer shown and described in application Ser. No. 462,139 filed Jan. 31, 1983 by John Zimmerman and assigned to the assignee of this application the disclosure of which is incorporated herein by reference.

Figure 1:
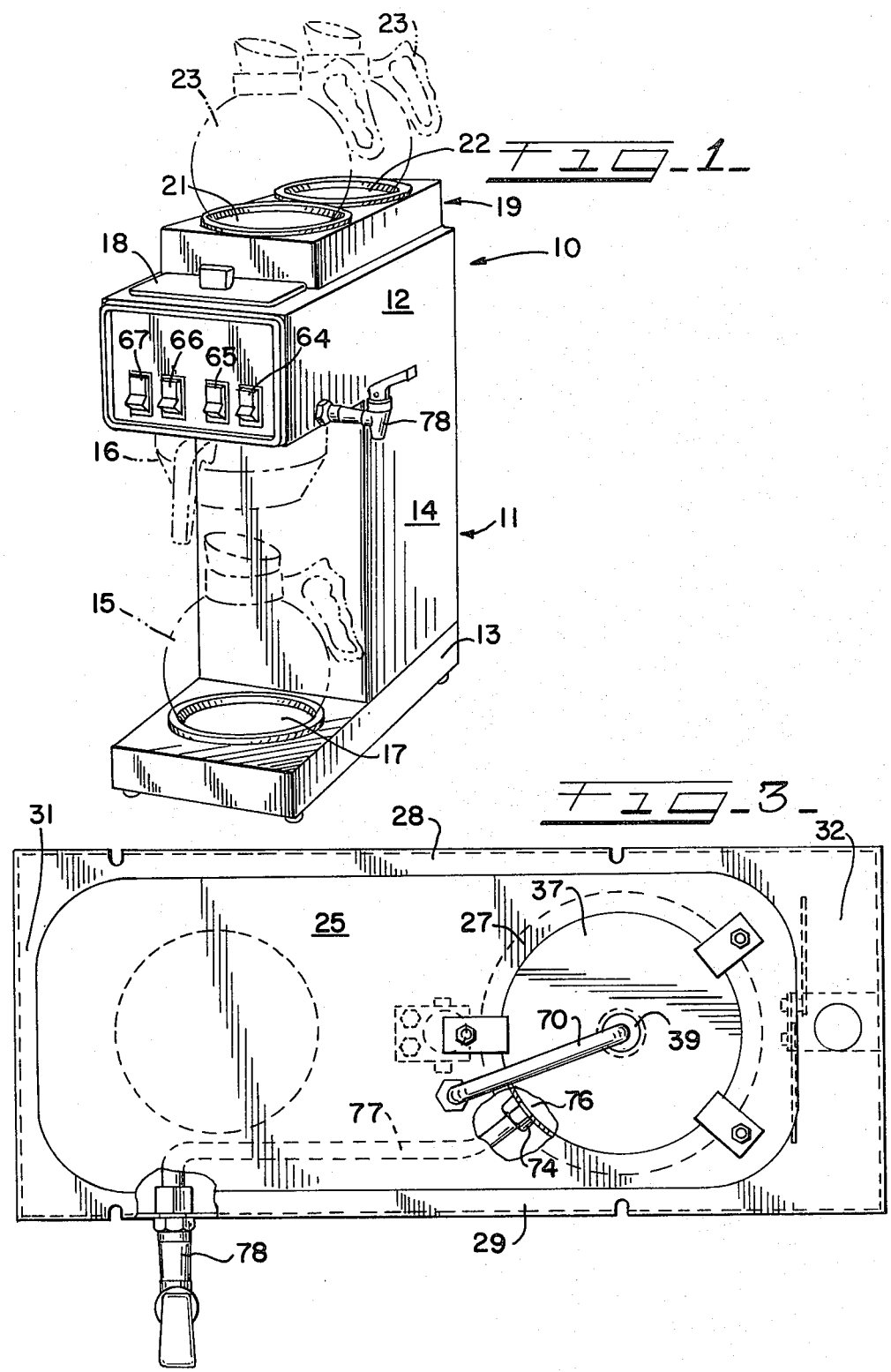
FIG. 1 is a perspective view of a coffee brewer forming one embodiment of the present invention which is capable of either automatic or pour-in operation, and wherein three coffee beakers or carafes are shown in broken outline along with a removable brewer funnel.

Referring to FIG. 1, a coffee brewer is indicated generally at 10 which has a generally C-shaped body 11 which includes an upper leg portion 12, a lower leg portion 13, and an interconnecting upright leg portion 14. The brewer body 11 is fabricated in known manner, desirably from stainless steel sheet, but it may be fabricated from other metals or from known plastics having suitable strength and durability. A brewer funnel of known type indicated at 16 is removably supported in known manner underneath the upper leg portion 12. A coffee beaker or carafe 15 is removably supported on the leg 13 underneath the funnel 16 on a heated warming plate or disc 17 mounted on the lower leg portion 13.

A cold water, pour-in opening 18 (FIG. 2) is located on the top front of the upper leg portion 12. Rearwardly thereof, a top warmer unit 19 is mounted which includes a pair of warming plates 21 and 22 on which two additional beakers or carafes 23 may be mounted.

Figure 2:
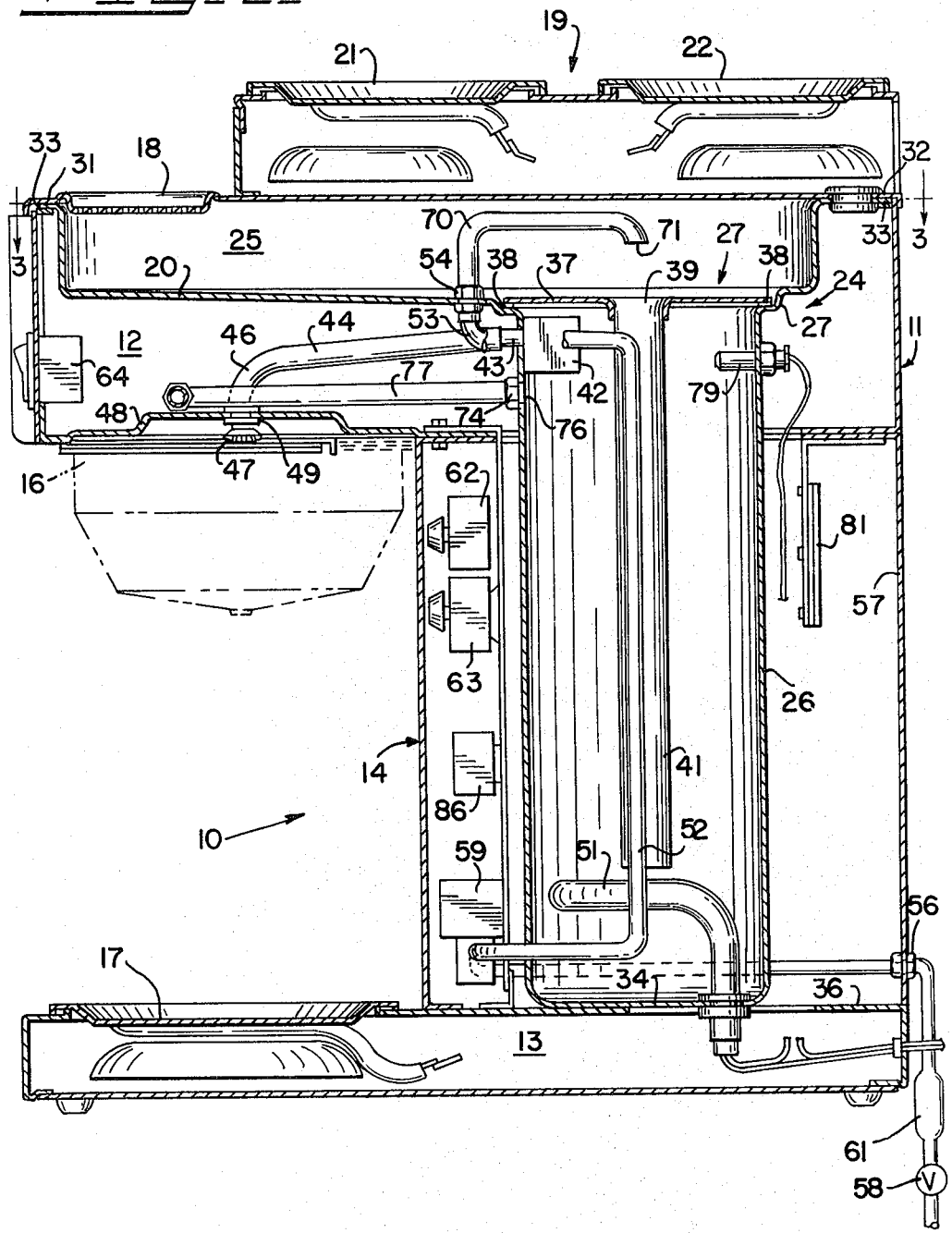
FIG. 2 is a longitudinal vertical sectional view of the brewer shown in FIG. 1, certain parts being shown in elevation.

The C-shaped brewer body 11 houses an elongated cold water basin 25 (FIGS. 2 and 3) and an upright hot water tank 26 (FIG. 2) integrally joined to form an L-shaped, combination elongated cold water basin and relatively deep hot water tank indicated generally at 24 (FIG. 2). The elongated cold water basin 25 is desirably die-pressed in known manner from stainless steel sheet and the relatively deep hot water tank 26 is welded to a bottom opening formed adjacent the deep end of the basin 25. The opening in the bottom of the basin 25 is formed in such a manner as to have a circumferential depression or recess 27. The upper circumferential edge of the deep tank 26 is welded to the bottom edge of the recess 27 so as to make the basin 25 and tank 26 an integral inverted L-shaped receptacle or container. The tank 26 is preferably fabricated from stainless steel sheet in known manner.

The upper edge of the shallow cold water pan or basin 25 is provided with a continuous out-turned, horizontal flange comprising side portions 28 and 29 and end portions 31 and 32 (FIG. 3).

It will be seen from FIG. 2 that the bottom 20 of the basin 25 slopes toward the bottom recess 27 so that cold water poured into the basin 25 will flow and drain into the tank 26.

The manner in which the unit 24 is mounted and supported within the housing or body 11 of the brewer is shown in FIG. 2. Referring to FIG. 2, it will be noted that the upper leg portion 12 of the body 11 has an in-turned horizontal flange flange 33 formed around the upper edge thereof. The out-turned flange on the upper edge of the basin 25 is dimensioned so as to fit over and rest flatwise upon the in-turned flange 33.

The height of the deep tank 26 is so dimensioned that the bottom 34 thereof is spaced at least slightly above the top wall 36 of the lower leg portion 13 so that the lateral flange on the basin 25 will rest on the in-turned flange 33.

In a brewer 10 capable of making two-quart batches of coffee, the tank 26 can have, by way of illustrative example, an inside diameter of 5 inches and a depth of 14 inches giving it a capacity of 275 cubic inches (i.e. slightly over two fluid quarts). The capacity of the shallow basin 25 suitable for a hot water tank 26 of such capacity is 155 cubic inches with the interior of the basin having a length of 15¼ inches, a width of 6¼ inches and a depth ranging from 1¾ to 1½ inches.

The circular recess 27 communicating between the bottom 20 of the basin 25 and the top of the tank 26 is closed by a disc or lid 37 which rests on a ring gasket 38 (FIG. 2) seated in the recess 27. A central drain opening 39 is provided in the disc 37 which communicates with the upper end of a vertical cold water tube 41 (FIG. 2), the upper end of which is welded or otherwise suitably joined to the underside of the disc 37. The bottom end of the cold water tube 41 terminates adjacent the bottom 34 of the tank 26 so that as cold water flows downwardly through the tube it is discharged into the lower portion of the tank 26 and thereby displaces upwardly the hot water contents in the tank 26. This manner of operation is well-known in connection with brewers of the hot water displacement type wherein batches of cold water displace hot water from a hot water tank.

An inverted siphon cup 42 is positioned adjacent the top of the tank 26 and the side thereof facing the removable brewer funnel 16. The cup 42 is carried by the inner end of a nipple 43 which projects in fluid-tight relationship through a suitable opening in the wall of the tank 26. The outer end of the nipple 43 connects with a downwardly slanted hot water tube 44 having a downturned outer or distal end 46 on the lower end of which a hot water spray head 47 is fastened in known manner. The end 46 passes through the spray head panel 48 and secured thereto by a two-part fastener 49 of known type.

Water within the tank 26 is heated in known manner by a heating element 51 that may take the form of a Calrod element or other known electrically energized heating element. The temperature of water in the tank can be adjusted by means of thermostat control 62 electrically connected with the heating element 51 in known manner. A so-called keep-warm blanket of known type (not shown) may also be provided in the form of a jacket for the tank 26.

The brewer 10 is equipped for automatic operation. Mounted in the upper leg portion 12 of the housing 11 is a cold water line or supply conduit 52 having an elbow 53 the upper end of which is clamped in watertight relationship to the lower end of a fitting 54 of known type mounted in the floor 20 of the cold water basin 25. The cold water line or conduit 52 extends through a support grommet 56 in the rear panel 57 and is exteriorly plumbed in suitable manner to a source of cold water under pressure such as the cold water service in a building served by a municipal water system. Preferably, the conduit 52 on the exterior of the appliance 10 has a manual shut-off valve 58 therein by which the appliance can be disconnected from its supply of water.

Disposed in the cold water inlet line 52 on the interior of the appliance is a solenoid actuated valve 59. After entering the brewer 10 through the rear panel 57, the cold water line 52 passes around the hot water tank 26 and connects with the inlet port of the solenoid valve 59. Also disposed in the cold water line 52, and on the exterior of the appliance 10, and downstream of the shut-off valve 58, a flow control valve 61 is disposed which automatically regulates the flow of cold water through conduit 52 at a predetermined value. The valves 58, 59 and 61 are of known commercial types. The solenoid actuated valve 59 is energized through conductors connected in circuit relationship with an adjustable timer of known commercial type indicated at 63. The adjustable timer 63 is also connected in known manner to a start switch 64 mounted on the upper front panel of the coffee brewer as shown in FIG. 1.

The cold water inlet line 52 delivers cold water into an inverted L-shaped tube or conduit 70 (FIG. 2) one downwardly turned leg of which is connected to the upper end of the coupling or fitting 54 with the opposite leg being of reduced length so as to have a discharge opening 71 centered directly over the outlet opening and drain hole 39. It is an important feature of the construction that the discharge opening 17 be both centered over the drain opening 39 and spaced a suitable distance thereabove (e.g. at least 1 inch). The purpose of this air gap or spacing between the opening 39 and the discharge opening 71 is to prevent contents of the appliance from siphoning back through the inlet line 52 in the event there should be a failure of pressure in the cold water supply system when valves 58 and 59 are open.

The purpose of having the discharge opening centered directly over the drain opening 39 is to prevent scale or solids from being deposited around the margin of the opening and upper end of the cold water tube 41.

In putting brewer 10 into operation, sufficient cold water is introduced either through the cold water pour-in opening 18, or through cycling of the automatic feature so as to completely fill the hot water tank 26. The fact that the tank is filled will be known when water commences to flow out through the side tube 44 and discharge from the spray head 47. When the hot water tank is thus filled, the heating element 51 will be energized and, thereafter, the warmers 17, 21 and 22 likewise energized as needed. Once the cold water contents of the tank 26 have had an opportunity to come to the desired elevated temperature, a filter is placed in the brewer funnel 16 and the desired amount of coffee is deposited in the filter. Then the funnel is inserted into place on the underside of the top leg portion 12 so as to be supported beneath the spray head 47.

In operation of the brewer 10 in the automatic mode with the brewing funnel 16 being loaded with a fresh charge of coffee or tea in a filter, with a carafe 15 disposed on the bottom warmer 17, and with the bottom warmer switch 67 on, the start button of the switch 64 is depressed to its on position and then released, thereby causing the solenoid actuated valve 59 to be actuated to the open position for a predetermined time depending on the setting of the timer 63. During the time the valve 59 is open, cold water flows in through the cold water line 52 in a controlled manner as a result of the operation of the flow control valve 61, even though there is normally some fluctuation in the pressure. The rate of flow of the cold water and discharge thereof from the opening 71 is such that flow of hot water displaced from the upper portion of the hot water tank 26 and discharged through the spray head 47 can take place at the same rate, thereby preventing any accumulation of cold water underneath the discharge opening 71.

The entrance of the cold water into the bottom of the hot water tank 26 is at such a rate that it does not mix to a substantial extent with the hot water therein, but rather, the in-coming cold water displaces the hot water upwardly so that it commences to flow out through the side tube 44. Once this flow has started, it will continue due to siphoning action until the water level in the tank 26 drops below and exposes the bottom of the inverted siphon cup 42. When the bottom of the inverted siphon cup 42 is exposed, siphon action ceases, and no more hot water discharges from the tank 26. Consequently, it is seen that the normal level of water in the tank is substantially that level established by the bottom of the inverted siphon cup 42. As is well-known, hot water sprays from the spray head 47 onto the ground coffee in the brewing funnel and the coffee beverage forms in the funnel and discharges through the bottom opening of the funnel 16 into the carafe or beaker 15 setting on the warmer plate 17.

In the event of some malfunction which interrupts the normal operation of the coffee brewer 10 in the automatic mode, the supply of cold water will be shut off manually by operation of the shut-off valve 58 in the cold water supply line. The brewer 10 can then be operated as a pour-in brewer by manually dumping batches of cold water through opening 18 into the cold water basin 25.

It will be seen that up to three batches or carafes of coffee may be prepared and maintained at one time on the brewer 10 by using the three warmers 17, 21 and 22.

In accordance with the present invention, the coffee brewer 10 provides a feature allowing the convenient removal of a single serving of hot water from the tank 26. The tank 26 is provided with a second hot water outlet which in this embodiment comprises a second nipple 74 (FIG. 2) projecting in fluid-tight relationship through another suitable opening 76 in the wall of the tank 26. The outer end of the nipple 74 connects with one end of a horizontal hot water tube 77 which in turn is connected at its other end with a hot water faucet 78 (FIG. 1) of known type. The hot water faucet 78 is positioned on the right vertical surface of the upper leg portion 12, slightly below the outlet opening 76 with which it is connected by a hot water tube 77.

A water level probe 79 is mounted within the tank 26 at a level at which it restricts the upper level of water in the tank 26 to just below the bottom of the siphon cup 42. Consequently, when the hot water faucet 78 is opened, hot water will flow out of the tank 26 by reason of the pressure head available, but there will be no danger of hot water siphoning to the spray head 47.

Positioned adjacent the top of the tank 26, on the side thereof facing the rear of the brewer 10, is a water sensing probe 79 of known type that functions to sense the presence and absence of water. The probe 79 projects in fluid-tight relationship through a suitable opening in the wall of the tank 26. The underside of the probe 79 is positioned at approximately the same level as the bottom of the inverted siphon cup 42.

As water is drawn off through the hot water faucet 78, the water level in the tank 26 will naturally tend to fall below the probe 79. This results in a counter-acting response in a liquid level control circuit indicated generally at 81 (FIG. 4) which includes the hot water probe 79, and the solenoid controlled valve 59. The level control circuit indicated generally at 81 controls the opening and closing of the solenoid valve 59 in response to signals provided by the water level probe 79.

When hot water is drawn through the hot water faucet 78, the water level sensing probe 79, in known manner, actuates the level control circuit 81, which in turn provides a control signal suitable for causing the solenoid controlled valve 59 to open, allowing cold water to flow through the discharge opening 71, and into the tank 26. As long as the water level in the tank 26 remains below the water level probe 79, the level control circuit keeps the solenoid controlled valve 59 open, allowing cold water to enter the tank 26. When the water level in the tank reaches the level of the probe 79, the valve 59 is closed and no additional water enters the tank 26. Thus, it is seen that the level control circuit 81, together with the water level probe 79, maintains the water in the tank 26 at a predetermined level when hot water is drawn through the hot water faucet 78.

Figure 4:
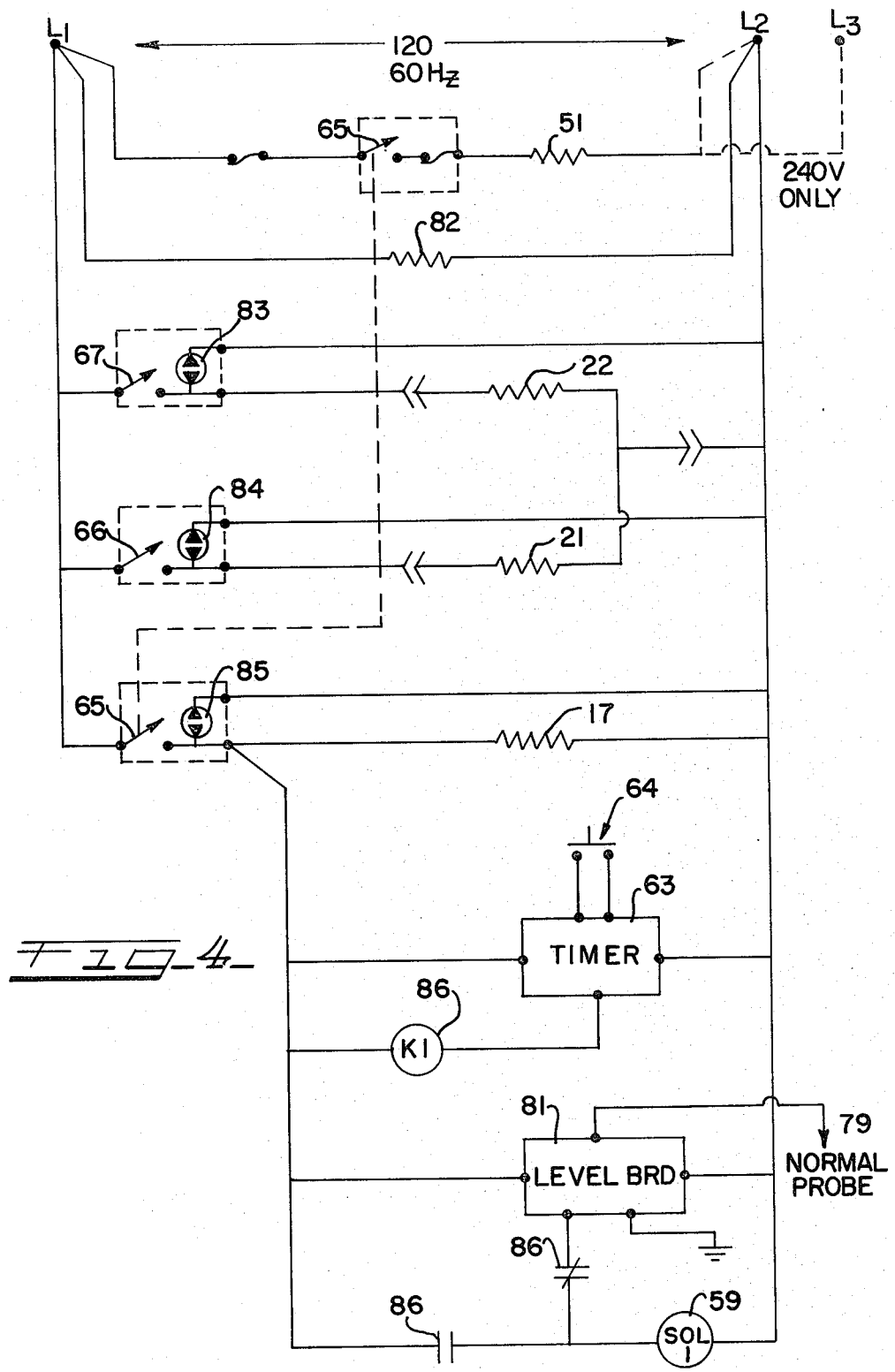
FIG. 4 is a simplified circuit diagram for the brewer of FIGS. 1-4.

FIG. 4 is an electrical circuit diagram of the wiring of the brewer 10 with energization from a 120 volt, 60 Hz. current source. The circuit is seen to include the tank heater 51, preferably a blanket heater 82, a top rear warmer 22, a top front warmer 21, and a bottom warmer 17. The tank heater 51 is normally disposed within the tank 26, and is used to bring and return the temperature of the water therein to brewing temperature. The blanket heater surrounds the outer surface of the tank 26 and serves to maintain water within the tank 26 at the desired brewing temperature during periods when hot water is not being removed from the hot water tank. The function and relationship between the blanket heater 82 and tank heater 51 are set forth in Martin U.S. Pat. No. 3,736,155 dated May 29, 1973, the disclosure of which is incorporated herein by reference.

Top rear, top front and bottom front warmers 22, 21 and 17 warm coffee beakers or carafes which are placed thereon. Switches 67, 66 and 65 allow independent operation of the top rear, the top front and the bottom warmers respectively. Neon indicators 83, 84 and 85 give a visual indication that the warmers are energized. Switch 65, which controls operation of the bottom warmer, also serves to control the operation of the tank heating element 51.

Because the timer circuit 63 and the level control circuit 81 may each provide a control signal suitable for actuating the solenoid controlled valve 59, and since it is not desirable that both be operative at the same time, control means are provided for controlling which of the two signals will dominate and control the valve 59 at any given time. In this embodiment, such means include selector means in the form of an SPDT Relay 86, electrically associated with the timer circuit 63, the level control circuit 81, and the solenoid controlled valve 59 for directing one of the control signals to the solenoid valve 59. The relay 86 is actuated upon application of a signal from the timer circuit 63, and remains activated throughout the period during which the timer 63 is actuated.

The control signal output of the level control circuit 81 is electrically connected through the normally closed contacts of the relay 86 to the solenoid controlled valve 59. The timer circuit 63 is electrically connected with the solenoid controlled valve 59 through the normally open contacts of the relay 86. Thus, it is seen that during normal operation of the brewer, i.e. when the automatic brewing cycle is not activated, the solenoid controlled valve is responsive to the control signal provided by the level control circuit 81. When the automatic cycle is activated by depressing and releasing button 64, the relay 86 is actuated by the signal provided by the timer 63, which results in the solenoid controlled valve 59 being non-responsive to the control signal provided by the level control circuit 81, and responsive to the control signal provided by the timer circuit 63.

It is seen that this system allows a single solenoid controlled valve 59 to be used in the brewer, resulting in a saving in component cost and minimizing complexity in contrast to a system in which separate solenoid valves, independently controlled, might be used, one for the automatic brewing, and a second for level maintenance functions.

What is claimed is:

1. Beverage brewing apparatus capable of operating automatically comprising, in combination, a cold water basin provided with a drain opening, a cold water inlet line for supplying cold water to said basin from a pressurized water supply, valve means in said cold water inlet line for opening and closing said line, valve actuator means for opening and closing said valve means to either allow cold water to flow through said cold water inlet line and into said basin or prevent cold water from flowing through said line, a hot water tank under said basin, means for heating water in said tank, a cold water tube having its upper inlet end connected to said drain opening and having its lower outlet end disposed in the lower portion of said hot water tank whereby cold water in said basin empties by gravity into the lower portion of said hot water tank, a hot water spray head, a siphon tube interconnecting said spray head with a first hot water outlet opening adjacent the top of said hot water tank whereby hot water displaced by cold water entering the lower portion of said tank flows through said siphon tube to said spray head through which it discharges, means for supporting a brewing funnel beneath said spray head, a hot water faucet, a second hot water outlet opening adjacent the top of said hot water tank and at an elevation below said first hot water outlet opening and above said hot water faucet, a hot water faucet tube interconnecting said faucet with said second hot water outlet opening, level control means operatively associated with said valve means for opening said valve means allowing cold water to flow into said basin when the level of water in said tank falls below a predetermined level and for closing said valve means when the level of water in said tank reaches said predetermined level, timer means operatively associated with said valve means for opening said valve means and for closing said valve means a predetermined time after such opening thereby allowing a predetermined quantity of cold water to flow to said basin when said timer means is actuated, control means for disabling said level control means when said timer means is actuated and for re-enabling said level control means when said timer means is not actuated.

2. A beverage brewing apparatus according to claim 1 wherein said valve means comprises a single solenoid valve.

3. A beverage brewing apparatus according to claim 2 wherein said level control means includes a water level probe at least partially disposed within said tank.

4. A beverage brewing apparatus according to claim 3 wherein a siphon cup which is open at the bottom is mounted on the interior of said hot water tank so as to provide communication between said first hot water outlet opening and the interior of said hot water tank through said open bottom, and wherein said water level probe is located so as to maintain said predetermined level of water at approximately even with the open bottom of said siphon cup.

5. A beverage brewing apparatus according to claim 2 wherein said control means include selector means for directing one of a plurality of control signals to said valve actuator means.

6. A beverage brewing apparatus according to claim 5 wherein said selector means comprises an electrical switch.

7. A beverage brewing apparatus according to claim 6 wherein said electrical switch is a relay.

8. A beverage brewing apparatus according to claim 7 wherein said relay is an SPDT relay.

* * * * *